Figure 1:
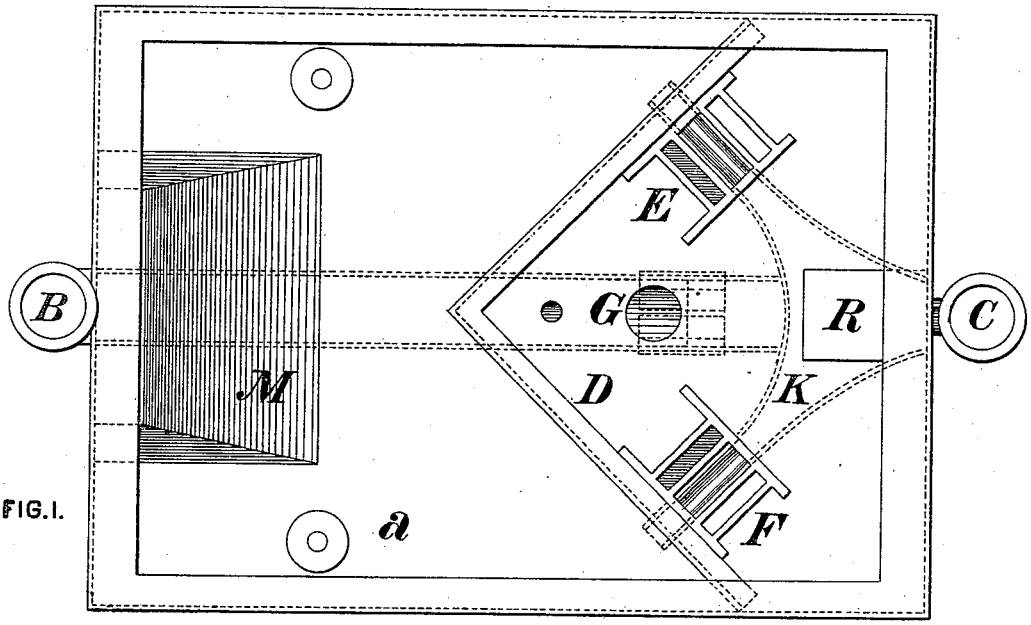

A. CARPENTER.
Gas-Meter.

No. 228,513. Patented June 8, 1880.

WITNESSES.
INVENTOR.

United States Patent Office.

AZARIAH CARPENTER, OF NEW YORK, N. Y., ASSIGNOR TO THE AMERICAN METER COMPANY, OF SAME PLACE.

GAS-METER.

SPECIFICATION forming part of Letters Patent No. 228,513, dated June 8, 1880.

Application filed May 13, 1879.

*To all whom it may concern:*

Be it known that I, AZARIAH CARPENTER, of the city and county of New York, in the State of New York, have invented a certain new and useful Improvement in Gas-Meters, of which improvement the following is a specification.

Consumers of illuminating-gas frequently make complaints against the meters which are furnished by the gas companies to register the consumption, and the newspapers are almost daily presenting such complaints, alleging that the registration is grossly in excess of any possible consumption in this or that particular instance; but the public rarely hears of another class of cases in which the gas company finds that the meter has been tampered with by the consumer and the mechanism rendered inoperative or so disarranged that it does not register the gas which passes through the meter. This fraudulent mutilation of the meters has become so common that it is highly desirable to provide some safeguard against it which shall prevent the loss to which the companies are subjected thereby, and such prevention is the object of my improvement.

It is well understood that illuminating-gas is distributed from the gas-holder through large mains from which a service-pipe leads off into the premises to be supplied. This service-pipe or supply-pipe is connected with an inlet-pipe at one end of the gas-meter, and the gas supplied from the main enters this inlet-pipe, (under pressure applied in the gas-holder,) passes through it and through the measuring mechanism inclosed within the meter, and, after operating the measuring and registering mechanism, issues at the opposite end of the meter through an outlet-pipe, from which it is conducted by branch pipes to the burners, so that when a burner is lighted the gas consumed should be drawn regularly from the main and pass from the inlet-pipe through the measuring mechanism to the outlet-pipe, and so be regularly measured and registered.

It will readily be understood that if the gas is allowed to pass from the inlet-pipe to and through the outlet-pipe without passing through the measuring mechanism, it will be consumed without being measured and registered, and this fact is availed of by dishonest consumers, who, as a very simple expedient for their purposes, make an opening from the inlet-pipe into what is called the "gallery" of the meter, and another opening from this gallery into the outlet-pipe, thereby providing the gas with a false traverse through the vacant space in the meter, from which space the measuring and registering mechanism is closed off, and thus, the current being diverted from the measuring mechanism, a full flow of unmeasured gas would be maintained from the inlet-pipe through the gallery and to the outlet-pipe without any registration of the consumption.

But since the gas company periodically examines and takes the state of the meter, it would soon detect this fraud if there were no consumption indicated, and would remove the meter for non-registry, or as defective. The dishonest consumer therefore shrewdly contents himself with openings (into and out of the pipes) of such diameters relative to the working capacity of his meter that while, say, one-half or two-thirds, or three-fourths of the gas is consumed without any registration of it, the other one-half, or one-third, or one-fourth, actually passes properly through the measuring mechanism and is measured and registered, and the gas company is thus deluded with an exhibition of economical consumption without such disproportion to the working capacity of the meter as would excite suspicion.

Figures 2, 3:
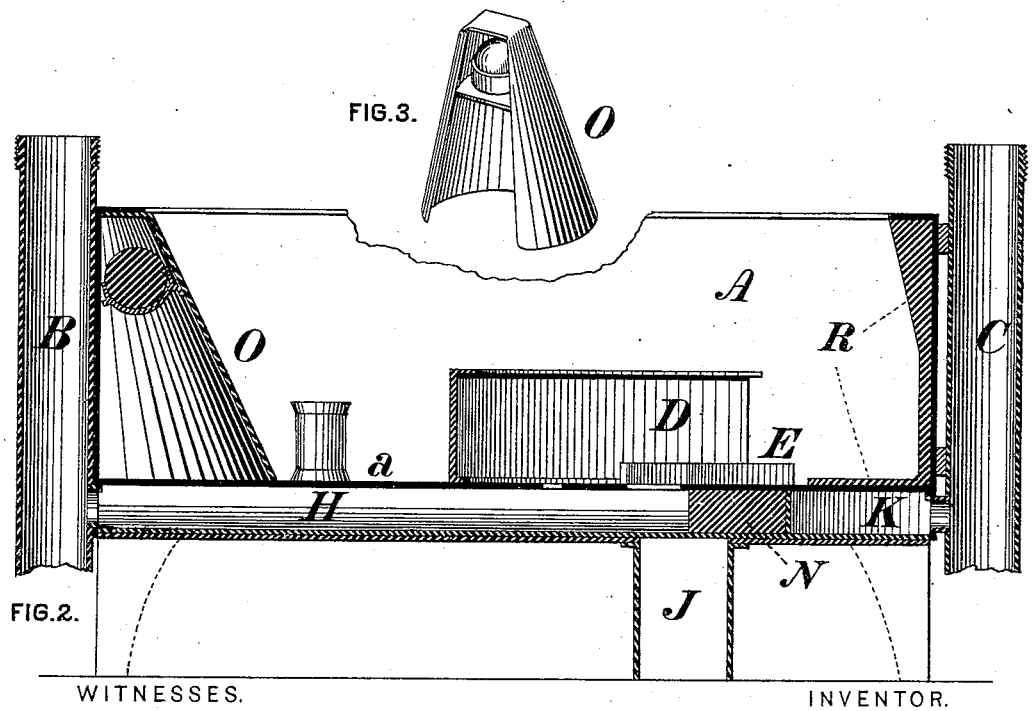

In the accompanying drawings, which form part of this specification, Figure 1 is a plan view of so much of a gas-meter as is necessary to show the application of my improvement. Fig. 2 is a longitudinal section through the same parts; and Fig. 3 is a view, in perspective, of one of the details of my invention.

As shown in the drawings, the upper part of the gas-meter comprises the chamber A, the bottom *a* of which constitutes the valve-table. The inlet-pipe B is at one end of this chamber and the outlet-pipe C is at the opposite end. A part of the chamber A is closed off by the valve-inclosure D, and the space within the chamber A outside of and above the triangular valve-inclosure is called the "gallery."

Within the valve-inclosure are the slidevalves E F and the opening G in the valve-table. Underneath the valve-table is the conduit-pipe H, which leads the gas from the inlet-pipe B to the opening G, through which it enters the valve-inclosure D, and from there it passes down through the valves E F and ducts J (only one of which is shown in the drawings) into the lower part of the meter, and after passing through or operating the measuring and registering mechanism it returns through the ducts J to the valves E F, through which it passes into the curved channel-way K, (shown in dotted lines in Fig. 1,) and thence to the outlet-pipe C and to the branch pipes and burners. One of the ducts J is shown in Fig. 2, and both of them are shown by dotted lines in Fig. 1.

The construction and operation of the valves E F are well understood. These valves are automatically moved, so that each of them alternately affords an opening through which the gas passes down through one of the ducts J into the measuring and registering mechanism, and an opening through which the gas, after operating the measuring and registering mechanism, comes up through one of the ducts J into the valve-inclosure, whence it passes to the outlet-pipe C.

It is evident that, the gallery being closed off, as above described, from the operating mechanism, it would not be difficult to establish a false traverse for the gas from the inlet-pipe into the gallery and from the gallery into the outlet-pipe by simply puncturing holes through the pipes and the adjacent wall or casing of the chamber A, and this is constantly being done by inserting an awl or other sharp-pointed instrument into the pipe at such an angle as will bring the point below the top plate of the chamber, and with a smart blow puncturing the pipe and the casing. Through the false inlet and false outlet thus established more or less of the gas, according to the size of these holes, will naturally enter the gallery, traverse it, and pass off from it into the outlet-pipe without passing through the conduit H or into the valve-inclosure, and, of course, in such cases so much of the gas as follows this false traverse will go out, as it comes in, unmeasured.

In meters having a horizontal outlet-pipe below the valve-table the same object would be effected if, instead of puncturing the inlet and outlet pipes and the casing, as above described, a perforation is made only through the end of the curved channel-way K where it meets the conduit-pipe H, in which case the false traverse of the gas, instead of being across or through the gallery, would be from the inlet-pipe directly along the conduit H, and through its perforated end into the curved channel-way K, and thence to the outlet-pipe C, without going into the valve-inclosure, and from that inclosure through the measuring mechanism, as already described. The extent of the flow through this perforation would depend, as already explained, upon the capacity of the meter and the relative size of the perforation, but more or less of the gas would pass through this false traverse unmeasured and unregistered.

To prevent such defeasance of the uses of the meter I adopt one or more of the devices shown in the drawings.

It is obvious that any hole, whether in the pipes or in the casing, which allowed the gas to leak into the cellar or room in which the meter is located would very soon attract attention and demand investigation. It is therefore essential, for the purposes of fraud upon the company, that the inlet and outlet pipes be punctured at points below the top of the gallery, so that the leaks in and out of the pipes shall also be into and out of the gallery. The only point of attack, therefore, is through the pipes in the line of their junction with the casing, and I accordingly place in the gallery a gas-tight false chamber, M, which extends around the inlet-pipe, fitting snugly under the top plate of the casing and projecting far enough into the gallery to insure its covering any point at which the pipe and the casing can be punctured, so that if an opening is made through the pipe and the case this opening will be made, not into the gallery, but into the false chamber, and the gas will accordingly still be shut off from the gallery, and will pass through the inlet-pipe and into the conduit H, and thence through the measuring mechanism. A similar false chamber will protect the outlet-pipe and prevent any gas that escapes into the gallery from passing to the burners without going through the valves.

Instead of these false chambers I contemplate using a re-enforce or wedge block, R, which is simply an L-shaped piece of hardened metal, soldered, riveted, or otherwise secured under the casing and upon the floor of the gallery opposite the inlet or the outlet pipe, the effect of this being to prevent any perforation or opening into the gallery by its resistance to the puncturing-instrument. I also contemplate using for the like purpose, where the meter has a horizontal outlet-pipe, as before mentioned, a block, N, of hardened metal, to re-enforce the end of the conduit-pipe H where it joins the curved channel-way K.

To prevent drilling through the pipes and casing and the false chambers, I have devised the peculiar false chamber O, Fig. 3, having a diaphragm and a cup in its upper end, in which cup I place a loose marble or ball, thus making a second false chamber within the main false chamber, these several devices being intended, respectively, to cure or to prevent the opening of a direct communication through the casing between the inlet and outlet pipes which will permit the gas to flow through the meter without being measured.

The loose ball in the chamber O is designed to prevent the puncturing of the diaphragm, as it is obvious that the ball will turn if struck by a pointed instrument, and the point of the instrument would thus act only upon the surface of the ball instead of reaching the diaphragm.

In addition to these devices I also contemplate setting the inlet-pipe or the outlet-pipe, or both of them, away from the casing, supporting such offset by short brackets connected with the pipe and the casing, as shown in Fig. 2, the length of the brackets being such that a puncturing-instrument cannot be introduced into the pipe at such an angle as will permit it to be driven through the pipe and through the casing, so that no more could be done than puncturing a hole through the pipe, and thus producing a leak which would soon betray itself.

Having thus described the nature and object of my improvement in gas-meters, what I claim as new, and desire to secure by Letters Patent, is—

1. The combination, with the inlet-pipe and the gallery, of a false chamber which will exclude from the gallery any gas that escapes from the inlet-pipe above the valve-table, substantially as described.

2. The combination, with the outlet-pipe and the valve-inclosure, of a false chamber or hood which will exclude from the outlet-pipe any unmeasured gas that may escape into the gallery above the valve-table, substantially as described.

3. The combination, with the conduit H, of the block N, substantially as and for the purposes described.

4. The combination, with the meter and the inlet-pipe or the outlet-pipe, of an offset, so as to leave a space between the pipe and the meter, substantially as and for the purposes set forth.

5. The combination, with the gallery and the false chamber, of the diaphragm and the ball, substantially as described, to prevent the chamber from being perforated to make an opening into the gallery.

AZARIAH CARPENTER.

Witnesses:
GEO. F. SHANNON,
RICHD. C. GREENE.